United States Patent
Sawai (10) Patent No.: US 11,435,036 B2
(45) Date of Patent: Sep. 6, 2022

(54) PRESSURE CONTAINER

(71) Applicant: Toyota Jidosha Kabushiki Kaisha, Toyota (JP)

(72) Inventor: Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 306 days.

(21) Appl. No.: 16/732,569

(22) Filed: Jan. 2, 2020

(65) Prior Publication Data

US 2020/0217457 A1    Jul. 9, 2020

(30) Foreign Application Priority Data

Jan. 9, 2019  (JP) .............................. JP2019-002093

(51) Int. Cl.
  *F17C 13/06*    (2006.01)
  *F17C 1/02*     (2006.01)

(52) U.S. Cl.
  CPC ............... *F17C 13/06* (2013.01); *F17C 1/02* (2013.01); *F17C 2203/0604* (2013.01); *F17C 2203/0663* (2013.01)

(58) Field of Classification Search
  CPC ...... F17C 1/00; F17C 1/02; F17C 1/08; F17C 13/00; F17C 13/06; F17C 13/002; F17C 2203/0604; F17C 2203/06; F17C 2203/0602; F17C 2203/0663; F17C 2203/0658; F17C 2203/0634
  See application file for complete search history.

(56) References Cited

U.S. PATENT DOCUMENTS

| 8,925,756 | B2* | 1/2015 | Tarapata | F16J 13/12 |
|---|---|---|---|---|
| | | | | 220/582 |
| 10,753,474 | B2* | 8/2020 | Moutray | F16J 15/10 |
| 11,098,801 | B2* | 8/2021 | Bäumer | F17C 1/16 |
| 11,209,085 | B2* | 12/2021 | Moutray | F16J 15/10 |

(Continued)

FOREIGN PATENT DOCUMENTS

| CN | 103122902 A | 5/2013 |
|---|---|---|
| JP | 2000-291887 A | 10/2000 |

(Continued)

OTHER PUBLICATIONS

U.S. Appl. No. 16/942,766, filed Jul. 30, 2020; Inventors: Osamu Sawai et al.

(Continued)

*Primary Examiner* — Javier A Pagan
(74) *Attorney, Agent, or Firm* — Dinsmore & Shohl LLP (57) ABSTRACT

A pressure container includes a liner filled with gas inside, a reinforcement layer that is formed in contact with the outer surface of the liner by using a fiber reinforced resin and covers the liner from the outside, and a cap attached to the liner. The cap is formed into an annular shape, and includes a plurality of cap bodies that have engagement portions projecting toward the reinforcement layer and are arranged with intervals in a circumferential direction, and bridge portions that connect, in the circumferential direction, the cap bodies adjacent in the circumferential direction. The cap is attached to the liner in a state in which the bridge portions are deformed and the engagement portions of the plurality of cap bodies are engaged with the reinforcement layer.

6 Claims, 8 Drawing Sheets

(56) References Cited

U.S. PATENT DOCUMENTS

| | | |
|---|---|---|
| 2010/0012663 A1 | 1/2010 | Andreani et al. |
| 2015/0096957 A1 | 4/2015 | Etesse |
| 2018/0087719 A1 | 3/2018 | Cola |
| 2018/0195668 A1 | 7/2018 | Sawai |
| 2019/0186693 A1* | 6/2019 | Wilder ............... F17C 1/16 |
| 2021/0102665 A1 | 4/2021 | Mahieu et al. |
| 2021/0140588 A1* | 5/2021 | Sawai ............... F17C 13/06 |
| 2021/0237367 A1* | 8/2021 | Takami ............... F16J 12/00 |
| 2021/0239269 A1 | 8/2021 | Baumer |
| 2021/0252181 A1 | 8/2021 | Griffis |
| 2021/0254787 A1* | 8/2021 | Takami ............... F17C 1/16 |

FOREIGN PATENT DOCUMENTS

| | | |
|---|---|---|
| JP | 2001-317697 A | 11/2001 |
| JP | 2018-112204 A | 7/2018 |

OTHER PUBLICATIONS

Office Action dated Sep. 21, 2021 in U.S. Appl. No. 16/942,766.
Notice Of Allowance Issued To U.S. Appl. No. 16/942,766 dated Feb. 18, 2022.

* cited by examiner

PRESSURE CONTAINER

CROSS-REFERENCE TO RELATED APPLICATIONS

This application claims priority to Japanese Patent Application No. 2019-002093 filed on Jan. 9, 2019, which is incorporated herein by reference in its entirety including the specification, drawings and abstract.

BACKGROUND

1. Technical Field

The disclosure relates to a pressure container.

2. Description of Related Art

Japanese Unexamined Patent Application Publication No. 2018-112204 (JP 2018-112204 A) discloses a pressure container that stores hydrogen inside. The pressure container described in JP 2018-112204 A includes a cylindrical liner and a reinforcement portion (reinforcement layer) that is formed by using a carbon-fiber reinforced plastic (CFRP) and reinforces the liner. Further, caps are attached to the ends of the liner. Each cap is firmly attached to the liner such that projections provided on the cap bite into (deform) the reinforcement layer.

SUMMARY

From the viewpoint of reducing, for example, manufacturing costs of the pressure container, it is desirable that the number of components of the cap can be reduced.

The disclosure attains a pressure container in which the number of components of a cap can be reduced.

A pressure container according to one aspect of the disclosure includes a liner, a reinforcement portion, and a cap. The liner is configured to store gas. The reinforcement portion including a fiber reinforced resin, the reinforcement portion is provided in contact with an outer surface of the liner such that the outer surface of the liner is covered with the reinforcement portion. The cap is an annular shape. The cap includes a plurality of cap bodies and deformable portions. The cap bodies have engagement portions projecting toward the reinforcement portion, and the plurality of cap bodies are arranged with intervals in a circumferential direction. The deformable portions connect, in the circumferential direction, the cap bodies adjacent in the circumferential direction. The cap is attached to the liner in a state in which the deformable portions are deformed such that the engagement portions of the cap bodies are engaged with the reinforcement portion.

In the pressure container according to the aspect described above, thread grooves may be provided on outer peripheral portions of the cap bodies.

In the pressure container according to the aspect described above, the engagement portions may extend along fibers in the fiber reinforced resin that constitutes the reinforcement portion.

In the pressure container according to the aspect described above, a surface of each of the engagement portions, which is located opposite to a body of the liner may be a perpendicular surface along a radial direction of the cap.

In the pressure container according to the aspect described above, a plurality of engagement portions may be provided on inner peripheral portions of the cap bodies.

In the pressure container according to the aspect described above, a portion where the engagement portions are provided may be knurled.

The pressure container according to the aspect of the disclosure has an effect in that the number of components of the cap can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overall Structure of Pressure Container

The overall structure of a pressure container according to an embodiment of the disclosure is described with reference to FIG. 1.

Figure 1:
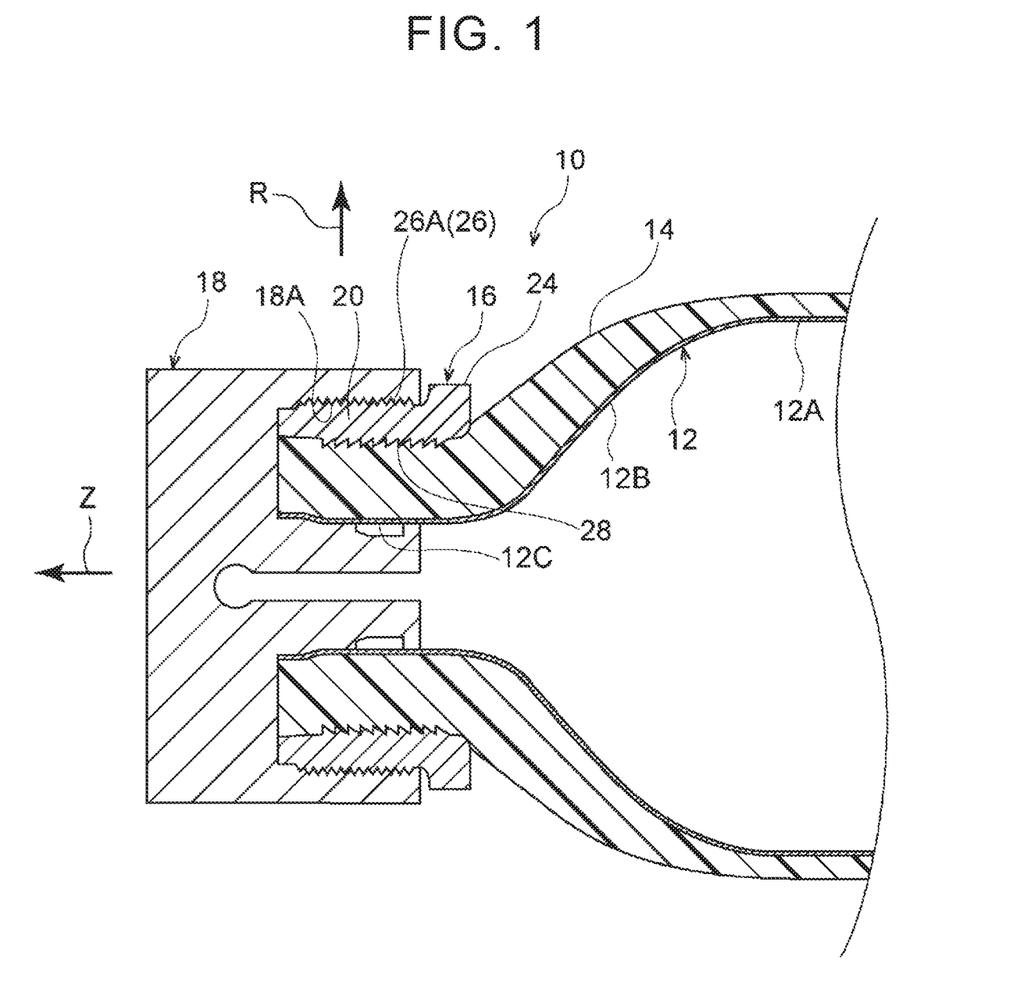
FIG. 1 is an enlarged sectional view illustrating a section of an end of a pressure container.

FIG. 1 illustrates an end of a pressure container 10 of the embodiment. The pressure container 10 constitutes a tank module mounted on a fuel cell vehicle. The tank module includes a plurality of pressure containers 10 connected via a fastening portion 18 described later or the like.

The pressure container 10 includes a liner 12 and a reinforcement layer 14. The liner 12 is filled with hydrogen gas inside. The reinforcement layer 14 serves as a reinforcement portion that covers the liner 12 from the outside.

The liner 12 is formed by using a resin material such as nylon. The liner 12 is formed into a substantially cylindrical shape with two open ends. A cylindrical part having a constant inner diameter and a constant outer diameter in the middle of the liner 12 in its longitudinal direction (arrow Z direction) is referred to as a body 12A. Parts that constitute both side portions of the liner 12 in its longitudinal direction (arrow Z direction) and are gradually narrowed with increasing distance from the body 12A are referred to as shoulders 12B. Cylindrical parts that constitute both ends of the liner 12 in its longitudinal direction (arrow Z direction) and have a substantially constant inner diameter and a substantially constant outer diameter smaller than those of the body 12A and the shoulders 12B are referred to as small-diameter ends 12C.

The reinforcement layer 14 is formed by using a fiber reinforced resin. In the embodiment, a carbon-fiber reinforced plastic (CFRP) is used as the fiber reinforced resin. The reinforcement layer 14 that covers the liner 12 from the outside is formed such that the carbon-fiber reinforced plastic is wrapped around the entire outer surface of the liner 12. The thickness of the reinforcement layer 14 increases with increasing distance from the body 12A to the small-diameter end 12C of the liner 12. The outer diameter of a part of the reinforcement layer 14 that is located at the small-diameter end 12C of the liner 12 (outer diameter before a cap 16 described later is crimped) is a substantially constant outer diameter.

The cap 16 and the fastening portion 18 are attached to the small-diameter end 12C of the liner 12 covered with the reinforcement layer 14. The one small-diameter end 12C of the liner 12 is closed by the fastening portion 18, and the other small-diameter end (not illustrated) of the liner 12 is connected to another pressure container 10 via a fastening portion. FIG. 1 illustrates the small-diameter end 12C of the liner 12 that is closed by the fastening portion 18.

Detailed Structure of Cap

Next, a detailed structure of the cap 16 is described with reference to FIG. 2 to FIG. 4.

Figure 2:
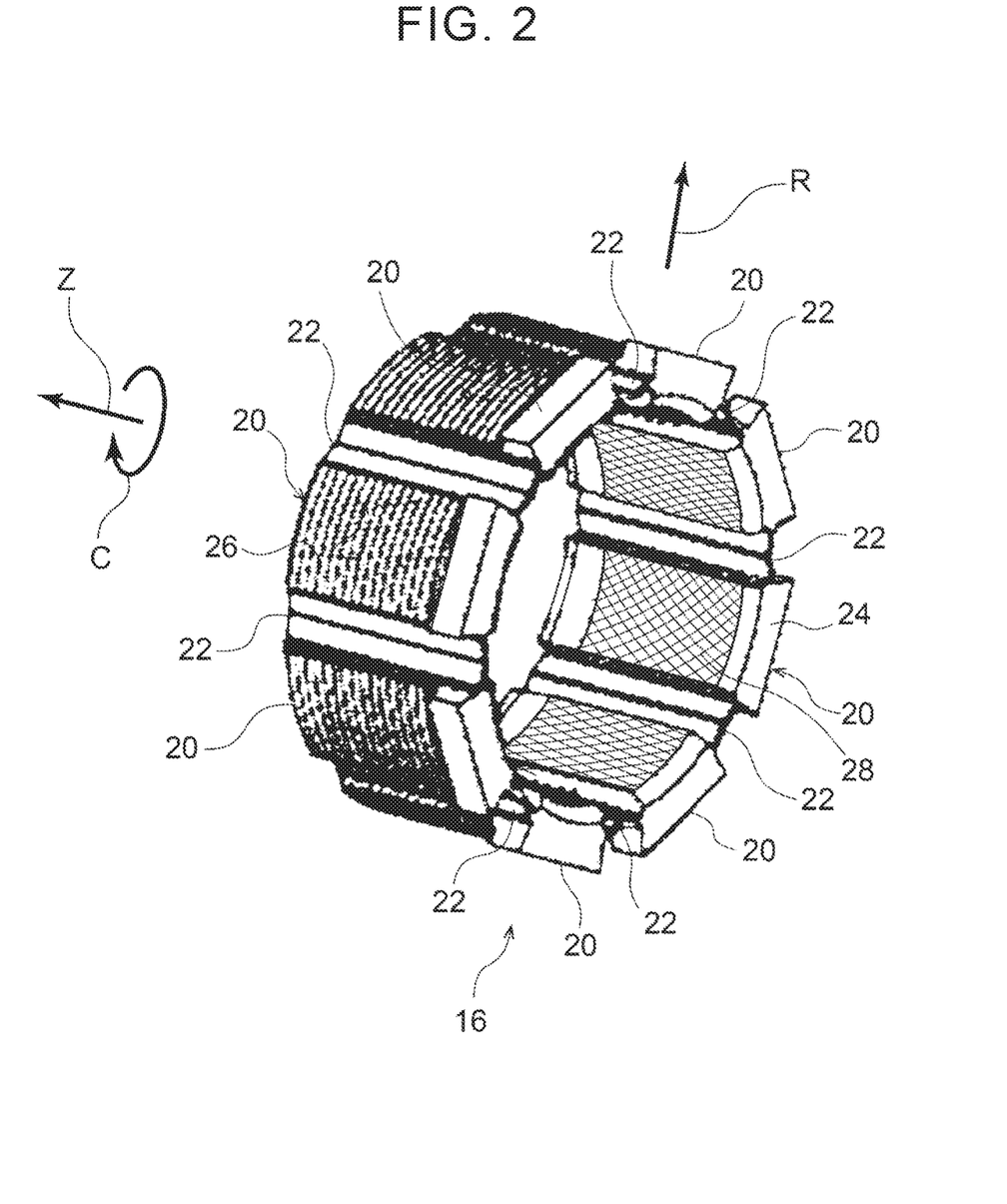
FIG. 2 is a perspective view illustrating a cap.

As illustrated in FIG. 2, the cap 16 is formed into an annular shape (tubular shape) by using a metal material. One side in an axial direction of the cap 16 (one side in the longitudinal direction of the liner 12) is represented by the arrow Z, an outer side in a radial direction of the cap 16 is represented by an arrow R, and one side in a circumferential direction of the cap 16 is represented by an arrow C.

The cap 16 includes a plurality of (eight in the embodiment) cap bodies 20 and bridge portions 22 serving as deformable portions. The cap bodies 20 are arranged with intervals in the circumferential direction. The bridge portions 22 each connect, in the circumferential direction, the cap bodies 20 adjacent in the circumferential direction.

The cap body 20 is formed into a shape of a plate extending in the axial direction with its thickness direction corresponding to the radial direction and curved radially outward when viewed in the axial direction. The end of the cap body 20 on the other side in the axial direction is a flange portion 24 bent radially outward.

The bridge portion 22 is formed into a shape of a plate extending in the axial direction with its thickness direction corresponding to the radial direction and curved radially inward when viewed in the axial direction. The thickness of the bridge portion 22 is set to a dimension smaller than the thickness of the cap body 20. The axial length of the bridge portion 22 is set to a length corresponding to the axial length of the cap body 20. The bridge portion 22 connects, in the circumferential direction, radially middle portions of one cap body 20 and the other cap body 20 adjacent in the circumferential direction.

On an outer peripheral portion of the cap body 20, a thread groove 26 is formed along the circumferential direction and the axial direction. The fastening portion 18 described later is threadedly engaged with the thread groove 26. A plurality of engagement claws 28 serving as engagement portions are formed on an inner peripheral portion of the cap body 20. The engagement claws 28 bite into an outer peripheral portion of the reinforcement layer 14 when the cap 16 is crimped as described later in detail.

Figure 3:
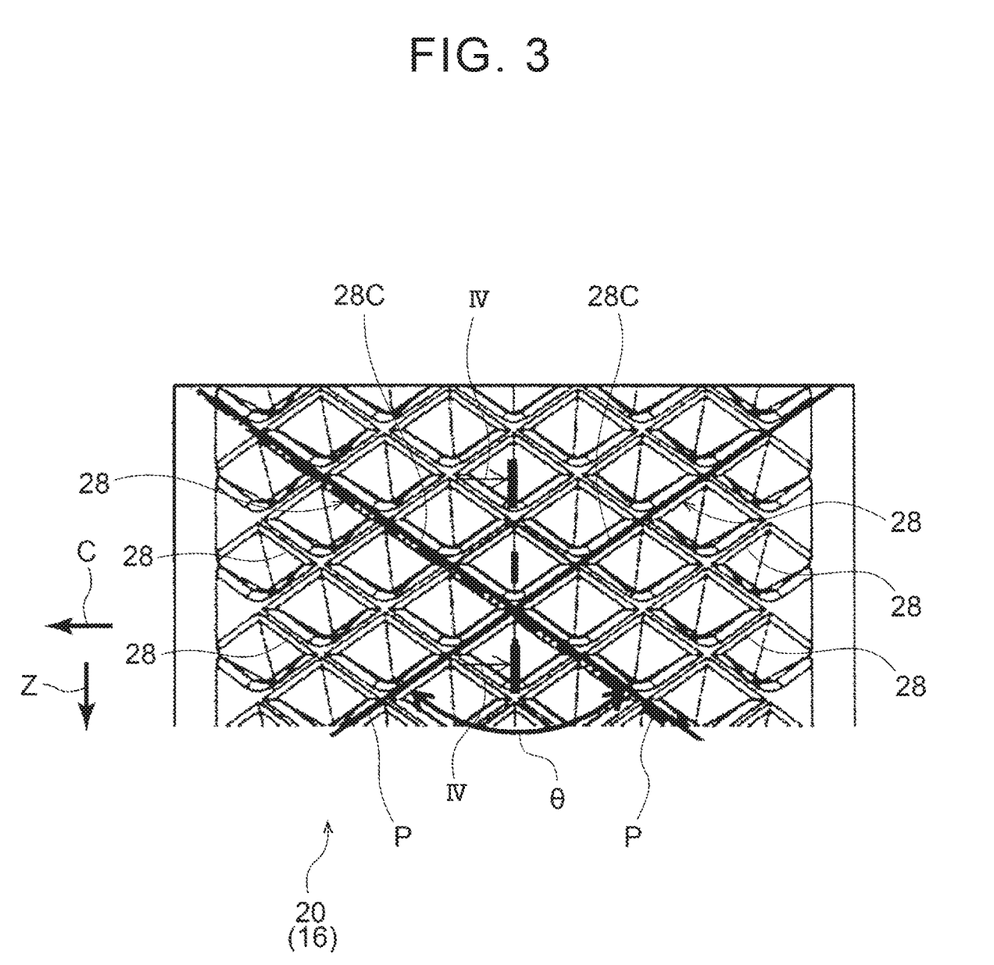
FIG. 3 is an enlarged plan illustrating a cap body of the cap that is viewed from an inner peripheral side.
Figure 4:
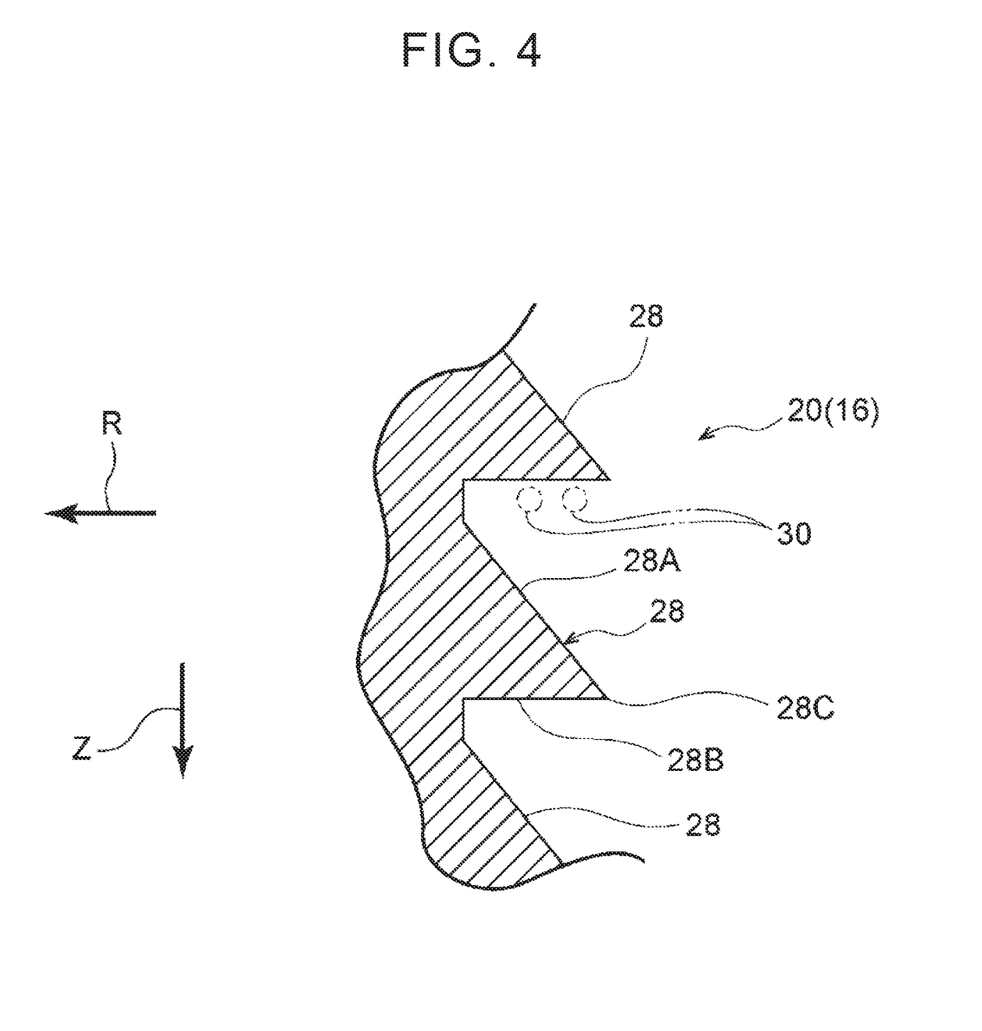
FIG. 4 is an enlarged sectional view illustrating engagement claws of the cap body cut along a line IV-IV illustrated in FIG. 3.

As illustrated in FIG. 3 and FIG. 4, the engagement claws 28 are formed into a serrated shape in which projecting distal ends (radially inner side) are acute when viewed in a cross section cut along the axial direction and the radial direction. In the embodiment, a surface 28A of the engagement claw 28 that is located closer to the body 12A of the liner 12 is inclined toward the body 12A with decreasing distance to the radially outer side. A surface 28B of the engagement claw 28 that is located opposite to the body 12A of the liner 12 is a perpendicular surface along the radial direction. In the embodiment, the engagement claws 28 are provided so that distal ends 28C of the engagement claws 28 exhibit a cross hatching pattern. In other words, the portion where the engagement claws 28 are formed is knurled. Thus, the engagement claws 28 extend along fibers in the fiber reinforced resin that forms the reinforcement layer 14. That is, an angle θ formed between two intersecting engagement claws 28 is equal to an angle formed between the fibers in the fiber reinforced resin that forms the reinforcement layer 14. In FIG. 4, fibers 30 are represented by long dashed double-short dashed lines. In FIG. 3, directions of the fibers 30 (see FIG. 4) are represented by reference symbols P.

Process of Attaching Cap

Next, a process of attaching the cap 16 and the like to the small-diameter end 12C of the liner 12 is described with reference to FIG. 1 and FIG. 5 to FIG. 8.

Figure 5:
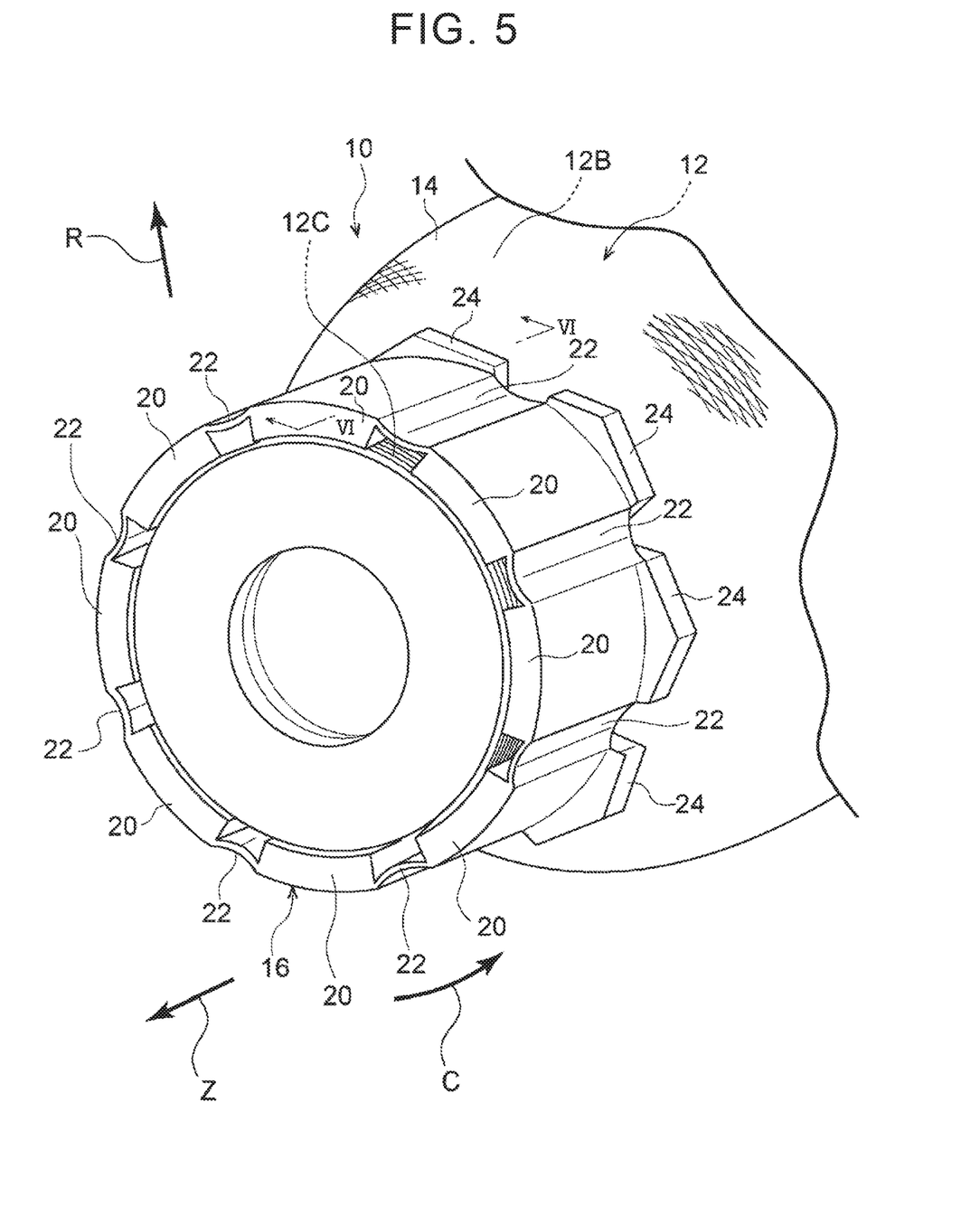
FIG. 5 is a perspective view illustrating an end of a liner, the cap, and the like, and illustrates a state before a fastening portion is threadedly engaged.
Figure 6:
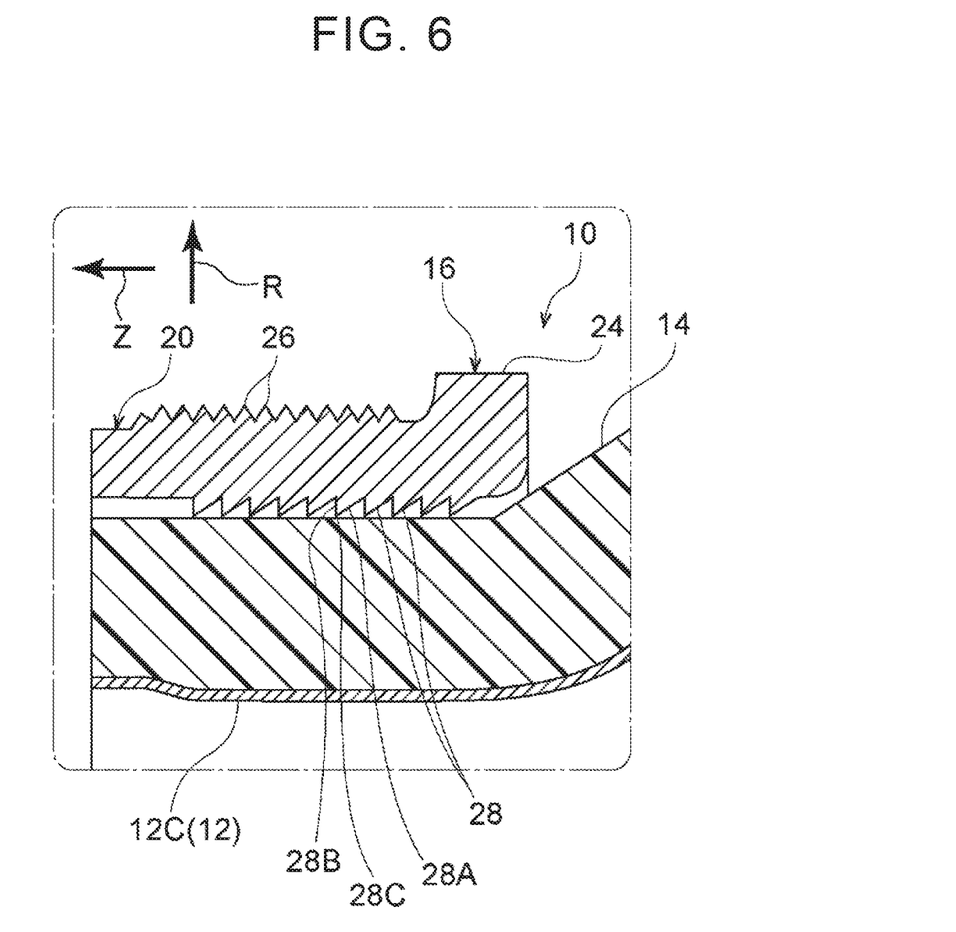
FIG. 6 is a sectional view illustrating the end of the liner and the like cut along a line VI-VI illustrated in FIG. 5.

As illustrated in FIG. 5 and FIG. 6, the cap 16 is first arranged on an outer peripheral side of the small-diameter end 12C of the liner 12 (and an outer peripheral side of the reinforcement layer 14) (cap arranging step). Thus, the distal ends 28C of the engagement claws 28 formed on the cap bodies 20 of the cap 16 are arranged close to the outer peripheral surface of the reinforcement layer 14.

Figure 7:
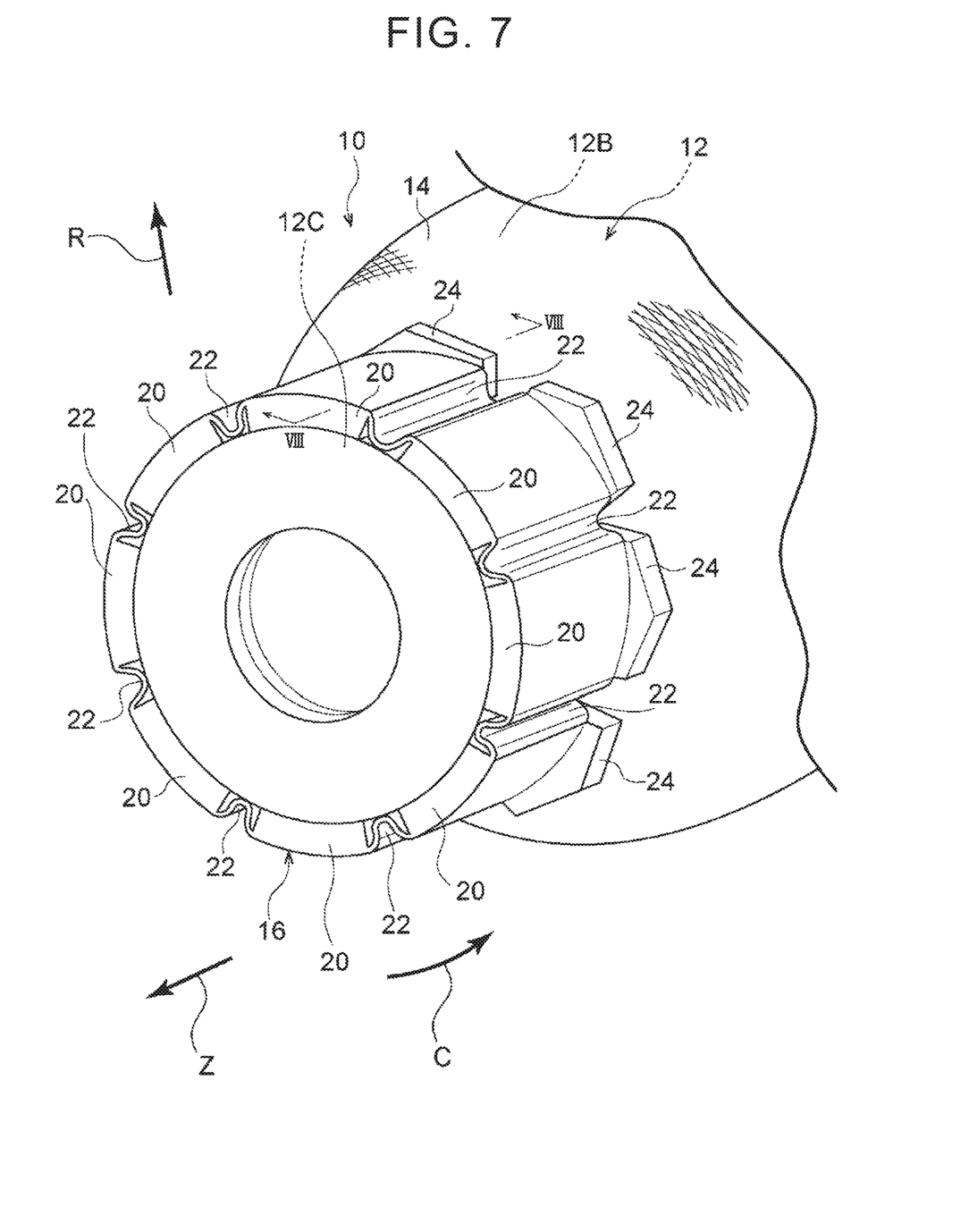
FIG. 7 is a perspective view illustrating the end of the liner, the cap, and the like, and illustrates a state in which the fastening portion is threadedly engaged.
Figure 8:
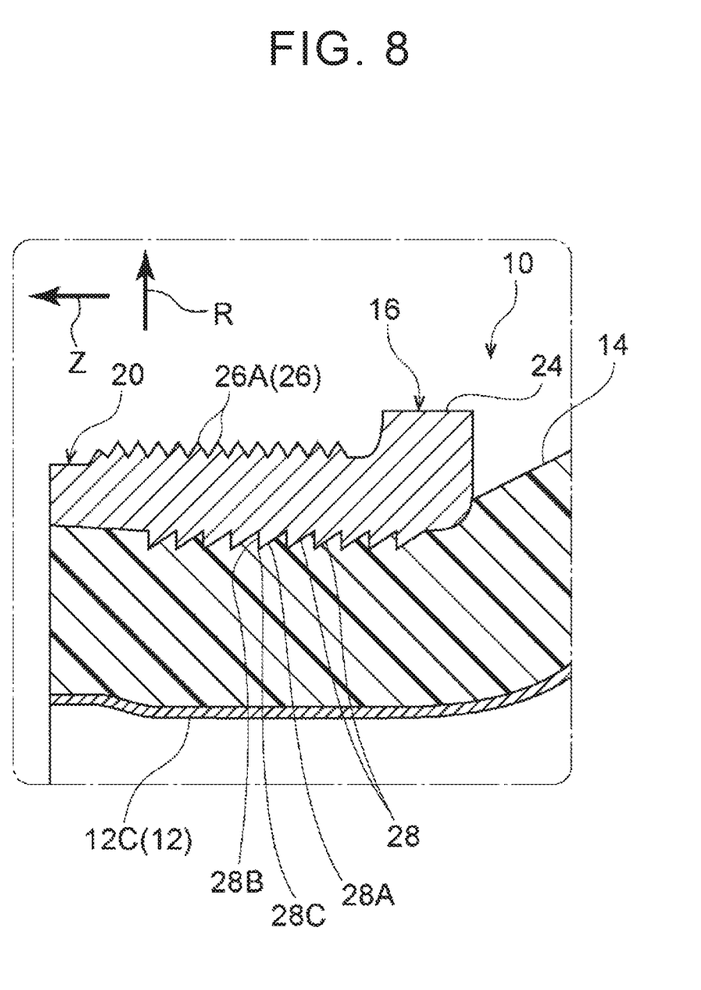
FIG. 8 is a sectional view illustrating the end of the liner and the like cut along a line VIII-VIII illustrated in FIG. 7.

Next, as illustrated in FIG. 7 and FIG. 8, the diameter of the cap 16 is reduced by crimping the cap 16 (cap crimping step). Specifically, the cap bodies 20 are moved radially inward by deforming the bridge portions 22 each connecting, in the circumferential direction, the cap bodies 20 adjacent in the circumferential direction (deforming the bridge portions 22 so that the bridge portions 22 are curved radially inward into a U-shape when viewed in the axial direction). Thus, the engagement claws 28 bite into the reinforcement layer 14 (resin portion in the fiber reinforced resin). If the reinforcement layer 14 is impregnated and cured by resin transfer molding (RTM), the deformed bridge portions 22 may have a sealing effect.

Through the steps described above, the cap 16 is attached to the small-diameter end 12C of the liner 12.

In the state in which the cap 16 is crimped (state in which the cap crimping step is completed), the thread grooves 26 formed on the outer peripheral portions of the cap bodies 20 define an external thread 26A as illustrated in FIG. 1. The fastening portion 18 is attached to the small-diameter end 12C of the liner 12 such that an internal thread 18A formed on the fastening portion 18 is engaged with the external thread 26A (fastening portion attaching step). In this state, the cap 16 is arranged at a position where the cap 16 is kept out of contact with hydrogen in the liner 12.

Actions and Effects of the Embodiment

Next, actions and effects of the embodiment are described.

In the pressure container 10 of the embodiment described above, the cap bodies 20 of the cap 16 are moved radially inward through the crimping step (see, for example, FIG. 6 and FIG. 8), and therefore the engagement claws 28 bite into the reinforcement layer 14 (resin portion in the fiber reinforced resin). In this structure, there is no need to provide a split structure of the cap 16 so that the engagement claws 28 bite into the reinforcement layer 14. As a result, the number of components of the cap 16 is reduced, and manufacturing costs of the pressure container 10 and the like can be reduced.

In the embodiment, the thread grooves 26 formed on the outer peripheral portions of the cap bodies 20 define the external thread 26A in the state in which the cap 16 is crimped. Thus, it is possible to easily attach, for example, the fastening portion 18 for connecting the pressure container 10 to the other pressure containers 10. Further, machining can be omitted by manufacturing the cap 16 by a method such as die-casting or metal injection molding (MIM).

In the embodiment, the engagement claws 28 formed on the cap bodies 20 of the cap 16 extend along the fibers in the fiber reinforced resin that forms the reinforcement layer 14. Thus, the engagement claws 28 bite into the reinforcement layer 14 (resin portion in the fiber reinforced resin) such that the engagement claws 28 push off the fibers in the reinforcement layer 14. Accordingly, it is possible to reduce damage to the fibers in the fiber reinforced resin that forms the reinforcement layer 14 when the engagement claws 28 bite into the reinforcement layer 14 (deform the reinforcement layer 14).

In the embodiment, the surface 28B of the engagement claw 28 that is located opposite to the body 12A of the liner 12 is the perpendicular surface along the radial direction. The cap 16 can firmly be engaged with the reinforcement layer 14 by aligning the fibers in the reinforcement layer 14 along the perpendicular surface.

Although one embodiment of the disclosure has been described above, the disclosure is not limited to the embodiment described above. It is understood that various modifications other than the embodiment described above may be made without departing from the scope of the disclosure.

What is claimed is:

1. A pressure container, comprising:
   a liner configured to store gas;
   a reinforcement portion including a fiber reinforced resin, the reinforcement portion being provided in contact with an outer surface of the liner such that the outer surface of the liner is covered with the reinforcement portion; and
   a cap being an annular shape, the cap including:
      a plurality of cap bodies that have engagement portions projecting toward the reinforcement portion and the plurality of cap bodies are arranged with intervals in a circumferential direction; and
      deformable portions that connect, in the circumferential direction, the cap bodies adjacent in the circumferential direction,
   the cap being attached to the liner in a state in which the deformable portions are deformed such that the engagement portions of the plurality of cap bodies are engaged with the reinforcement portion.

2. The pressure container according to claim 1, wherein thread grooves are provided on outer peripheral portions of the cap bodies.

3. The pressure container according to claim 1, wherein the engagement portions extend along fibers in the fiber reinforced resin that constitutes the reinforcement portion.

4. The pressure container according to claim 1, wherein a surface of each of the engagement portions, which is located opposite to a body of the liner is a perpendicular surface along a radial direction of the cap.

5. The pressure container according to claim 1, wherein the engagement portions are provided on inner peripheral portions of the cap bodies.

6. The pressure container according to claim 5, wherein a portion, where the engagement portions are provided, is knurled.

* * * * *